C. H. DUDLEY.
DISH RINSING AND DRYING-RACK.
APPLICATION FILED MAR. 27, 1911.
1,008,124.
Patented Nov. 7, 1911.
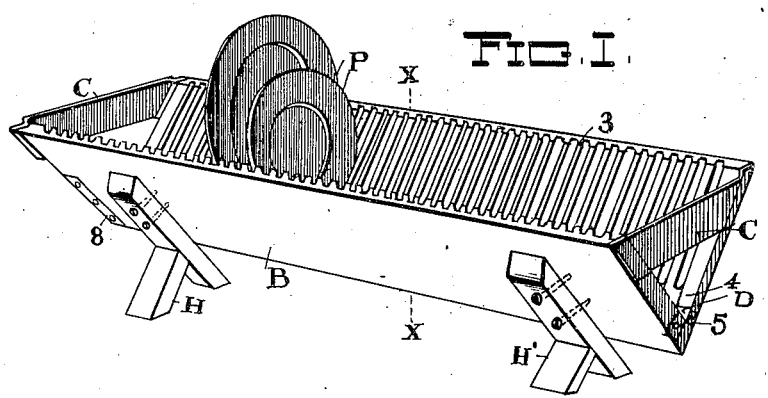
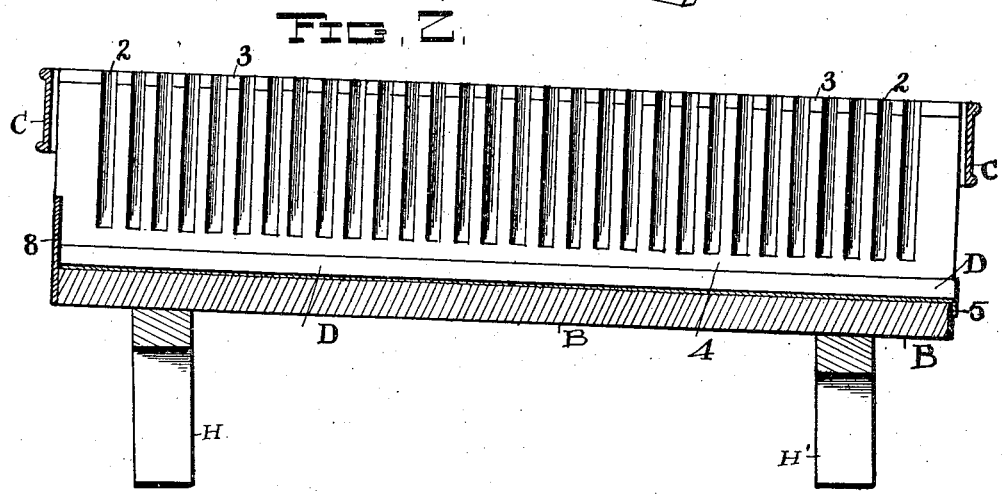
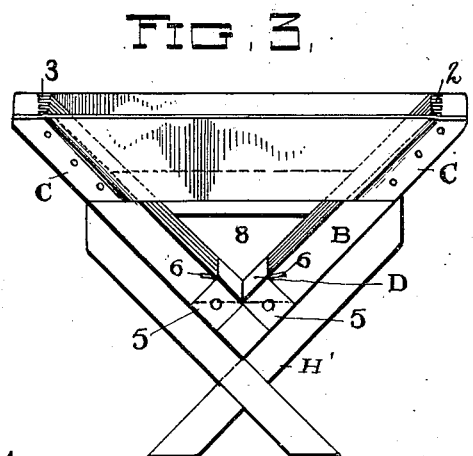
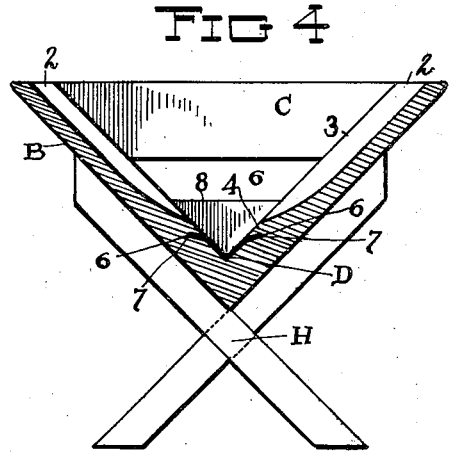
ATTEST
E. M. Fisher
F. C. Mussun
INVENTOR
Carl H. Dudley
BY
Fisher & Moser ATTYS.

UNITED STATES PATENT OFFICE.

CARL H. DUDLEY, OF OBERLIN, OHIO.

DISH RINSING AND DRYING RACK.

1,008,124.     Specification of Letters Patent.     Patented Nov. 7, 1911.

Application filed March 27, 1911. Serial No. 617,000.

*To all whom it may concern:*

Be it known that I, CARL H. DUDLEY, a citizen of the United States, residing at Oberlin, in the county of Lorain and State of Ohio, have invented certain new and useful Improvements in Dish Rinsing and Drying Racks, of which the following is a specification.

My invention relates to a dish rack, all substantially as shown and described and particularly pointed out in the claims.

In the accompanying drawings, Figure 1 is a perspective view of my new and improved rack showing two plates of different sizes supported therein side by side and serving to illustrate the utility of the rack for dishes of various sizes. Fig. 2 is a longitudinal sectional inside view of the complete rack. Fig. 3 is a lower end elevation and Fig. 4 is a cross section of the upper end of the rack.

The object and construction of the invention are clearly apparent from the foregoing views. The rack proper as an article consists of two flat boards B of wood nailed or otherwise secured together at their edges in V-shaped relation to each other and shown in this instance and preferably as mounted on crossed legs or "horses" H—H' near their ends, said horses being of varying elevation so as to provide a suitable drain for the water from the upper to the lower end of the rack. The rack as such is formed by cutting transverse grooves 2 in the sides at suitable intervals and which leave ribs 3 between them, and said grooves are spaced apart in greater or less width according to the size of dishes to be placed therein. All the grooves on both sides run out with a curve to a flat surface 4 at the bottom of said sides which renders said grooves self-cleansing. The grooves are directly opposite in the two sides and are approximately half an inch deep and say a quarter to half an inch across according to the dishes used, and by having the grooves arranged as closely together as the dishes will permit, I make it possible to place a large number of dishes within a limited space, which is one of the great advantages of this style of rack. Then again by having the rack in V shape I am enabled to use the same rack for large and small dishes alike and with equal facility. A full sized rack for domestic use is say ten to twelve inches across at its top and six to ten inches deep, and, having closed sides, all drippings and drainings must necessarily flow to the lower end of the rack because the moisture cannot escape otherwise. Emphasis is also laid on the fact that this rack is new and original in the art so far as I know and believe in the feature which enables various sizes of plates, platters and saucers to be bestowed therein as they come and regardless of their order or size up to the limits of the rack. Of course very large platters cannot be held therein unless the proportions of the rack be increased. This would be desirable for restaurant work but not for domestic purposes. As to size, it may be further added that in case the rack be used only for drying dishes, as some prefer, it is made for both rinsing and drying. In either case the drain is into the sink and it is not planned to have any of the rinsing water to run outside the rack, so that the perfect cleanliness and neatness of the rack is one of its most attractive features. Finally the bottom proper of the rack is provided with a special lining D to prevent possible leakage. I found in practice that it was very difficult to build a rack of this kind and prevent leakage in bottom edge, and hence in order to make a perfectly and permanently tight joint and have a surface that is easily kept clean I conceived the idea of laying a strip D of suitable sheet metal, say of galvanized iron, tin, nickel, copper or other metal in said bottom the full length thereof and secure the split ends of such lining over the ends of the trough or rack as seen at 5, Fig. 3, while the edges thereof are more or less flared and fit closely in the longitudinal scarfs 6 cut in the sides of the rack in the otherwise uncut surface 4. The said scarfs are cut at an upward inclination to the sides, and the edges 7 of the lining are adapted to slide lengthwise therein when the lining is put in place and thus be in position to perfectly shed the water and keep the wooden bottom portion of the rack perfectly dry. A plate 8 is secured across the upper end of the trough supplementary to lining D and adapted to prevent water from running out at the top thereof.

If the body of the device were made of all metal it could be struck up with the channels and ribs alternately in its sides and bent to V shape lengthwise and serve the same purpose as in wood, and yet wood is preferable because it is more quiet in use and less liable to break dishes by carelessness in handling.

Cross strips C rigidly connect the ends of boards B at their top, and these strips are preferably bowed outwardly in a small degree to permit nesting of the racks for compact and convenient shipment.

What I claim is:

1. As a new article of manufacture and sale, a rack to hold dishes constructed in substantially V shape lengthwise and having closed sides and opposite transverse grooves in said sides terminating in substantially curved lines above the immediate bottom of the rack.

2. A V-shaped rack for rinsing and drying dishes having closed flat sides provided with alternate grooves and ribs adapted to support dishes disposed edgewise therein, and said grooves terminating on the inside of the rack next above the flush side portions thereof, and a V-shaped metallic lining having its edges engaged in said sides below the terminals of said grooves.

3. A V-shaped rack for rinsing and drying dishes having closed sides and alternate grooves and ribs therein and provided with downwardly inclined scarfs lengthwise beneath said grooves and ribs, and a V-shaped metallic strip having its edges engaged in said scarfs and adapted to receive the drain from the dishes.

4. A V-shaped rinsing and drying rack for dishes open at one end and closed at the other and having closed flat sides provided with alternate grooves and ribs to support dishes and supports for said rack varying in height so as to allow water to drain from the open end of said rack.

In testimony whereof I affix my signature in presence of two witnesses.

CARL H. DUDLEY.

Witnesses:
W. F. HART,
NELLIE CORMEA.